United States Patent Office 2,935,472
Patented May 3, 1960

2,935,472

LOST CIRCULATION MATERIALS

Nicolas Paul Klaas, Arden Hills, Gordon M. Ide, Denmark Township, Washington County, and Buck Stricklin and John A. Brown, St. Paul, Minn., assignors to Minnesota Mining & Manufacturing Company, St. Paul, Minn., a corporation of Delaware No Drawing. Application August 16, 1954
Serial No. 450,220

2 Claims. (Cl. 252—8.5)

This invention relates to the drilling of wells. More specifically, the invention relates to materials (most suitably in pelletized form) for eliminating or reducing loss of circulation fluids from wells during the process of drilling the same. In the drilling of oil and gas wells, particularly, where drilling is carried to very considerable depths in the earth, it is necessary to provide means for cooling and lubricating the drilling mechanism, and for carrying cuttings out of the shaft being drilled, back to ground level. To accomplish these ends, it is customary to use a drilling fluid. Such fluid (which may comprise a clay-water mixture, to which suitable chemicals have been added) is pumped down through the drill pipe, through openings in the drill bit, and thence upwardly to ground level, where the fluid is screened of cuttings, etc. which have accumulated therein. The fluid is then recirculated through the system. Use of such circulation fluid is essential in the drilling of oil and gas wells of substantial depth by the rotary drilling method.

One very serious problem which has heretofore been encountered in the use of circulation fluid, is the escape of that fluid, from the bore hole, into surrounding formations through openings or crevices in the earth. Circulation fluids are relatively expensive and loss of them from the bore into adjacent areas raises the cost of drilling a well very substantially. Furthermore, loss of any major proportion of the fluid being used may result in the drilling bit becoming overheated, or stuck, or in other damage to the well or the equipment being used to drill the well. Furthermore, circulation fluid serves the function of carrying cuttings to the surface where they may be analyzed to determine the type of formation being penetrated. If major portions of the drilling fluid are lost from the shaft, such cuttings will no longer be carried to ground level for analysis, and opportunity to keep check on the nature of the strata being drilled is thus lost. In extreme cases, where quite a large proportion of the fluid is lost, or where high pressure regions are encountered by the drilling bit, loss of fluid from the shaft may result in what is commonly called a "blow out"; i.e., an eruption, at ground level, of water, gas or oil under pressure. This phenomenon occurs because the loss of fluid reduces hydrostatic pressure in the bore hole to a point where pressures encountered in the earth will no longer be counterbalanced by the circulation fluid.

The present invention provides a novel pellet, which when introduced in quantity to the circulation fluid, will substantially minimize loss thereof, through small openings, into strata surrounding the bore.

Various expedients have heretofore been used to correct or minimize the problem of loss of circulation fluid from oil and gas wells. Materials most commonly employed to correct this problem have been ground regenerated cellulose, ground or flaked mica, cotton seed hulls, sawdust, cut shavings, and other ground or pulverized material. Although such materials have some utility in reducing loss of circulation from the shaft through very small openings in the strata being penetrated, they are not wholly successful in preventing loss of fluid through openings of any substantial size. Such ground or pulverized materials are merely carried deeply back into crevices, etc. of relatively large size without achieving the desirable effect of closing off or plugging such openings at a point close to the bore. Furthermore, many of the organic lost circulation materials now commonly employed ferment after a few days in an oil well, lose much of their effectiveness as plugging agents, and contaminate the circulation fluid.

Another material which has been used to reduce loss of circulation fluid from wells is bentonite clay in the form of pellets coated with a water-soluble coating. Such pellets are disclosed in United States Patent No. 2,634,098, granted April 7, 1953, upon an application by Arthur L. Armentrout. Pellets of that kind, however, being constituted of dry bentonite clay become thoroughly dispersed in the clay-containing drilling fluid, upon dissolution of the coating upon them, and thus lose any function in respect to sealing off or plugging openings in the strata being penetrated. In the pellets of the present invention, as distinguished from those disclosed in the Armentrout patent, the undesirable feature above referred to is overcome, and dispersion of the pellets within the circulation fluid is avoided. In one instance, we avoid dispersion of our pellets within the fluid by incorporating within the pellet core certain "binder" materials which serve to maintain the unity of the pellet. In other instances, we avoid dispersion by careful choice of materials in the pellet core or by use of a water-insoluble pellet coating material which serves mechanically to prevent disintegration of the pellet while nevertheless allowing the pellet to swell to from two to five times its original size.

A principal object of the present invention is to provide granules or pellets which, when immersed in water or other drilling fluid at elevated temperatures (above 120° F.) will hydrate, swell, and gel, and thereafter have good plugging strength. Another principal object of the invention is to provide granules or pellets such as above mentioned which, after gelling, will clump or coalesce together to form larger bodies, which larger bodies will form a mat having high resistance to the passage of circulation fluid, when forced against the surface of the well shaft by pressure of the circulation fluid.

In one of its more specific forms, the pellets of the present invention comprise a fibrous material and a blend of dry chemicals. Said pellets are in some instances provided with a coating which will not quickly be permeated by cold water or cold water-containing drilling fluids, but which will be permeated quite rapidly by hot water or hot water-containing drilling fluid; e.g., fluid above 120° F. The last mentioned coated type of pellet swells less quickly than the uncoated type and thus is more fully adapted to be pumped to the point where circulation is being lost, before the swelling and gelling action commences. The water-resistant coating on such kind of pellets retards hydration of the pellet by the water constituent in the circulation fluid. Particular types of coatings which we have employed are coatings of rubber, rosin-based synthetic resin, and rubber/wax mixtures, generally applied as emulsions. Pellets so coated are unaffected for long periods of time by cold water or cold circulation fluids. However, when water or fluid is brought to the higher temperatures which normally exist deep in a well, coatings of the above mentioned types soften and permit water to penetrate to the pellet core. The pellets then undergo the swelling, gelling action which enables them to form an effective seal. Coatings of the kind above mentioned also provide a skin about the core of the pellet which adds to the tensile strength thereof.

In the practice of our invention, we have taken advantage of the temperature differential which exists between the surface of the earth and at the depths, within the earth, to which oil wells, etc. are frequently drilled, and we have provided a lost circulation pellet which is substantially unaffected, for periods of one hour or more, by soaking in a drilling fluid at ordinary surface temperatures. Our pellet will, however, swell and gel (and coalesce with other like pellets) when subjected to soaking in a drilling fluid at an elevated temperature, viz., 120° F. or above.

In some instances, we have found it desirable to add fibrous material (e.g., peat moss, glass fibers, etc.) to the pellet core and/or to the coating upon them to improve tensile strength.

One particular mixture of materials which has utility in the practice of our invention was compounded as follows: 43 parts of polyvinyl alcohol, 22 parts of sodium borate and 35 parts of peat moss fiber were blended and pelleted on a Simplex or Universal pellet mill. When pellets of this composition, in the amount of 30 pounds of pellets per 42 gallon barrel of mud were subjected to a temperature of approximately 160° F. for two hours, the individual pellets swelled to from two to three times their original size and had high strength in their swollen state.

If peat moss is omitted from the composition above set forth, and a composition comprised of 65 parts of polyvinyl alcohol and 35 parts of sodium borate is compounded, even better gel strength is obtained.

In instances where the circulation fluid is being used in wells penetrating to substantial depths, it is important that the swelling of the pellets be delayed for sufficient time to permit the pellets to be carried to the point to be sealed, and that the pellets should not, by action of the temperature encountered at substantial depths, be caused to swell prematurely, and thus possibly be not able to pass through the jets in the drill bit. When our pellets are to be used in wells of considerable depth, we have found it advantageous to coat them with a water-insoluble substance which will retard their swelling. One coating substance which we have found to work well is a coating made of rubber latices such as are sold by Goodyear Tire & Rubber Company under the trademark "Pliolite 160." Such rubber latices in an emulsion with a microcrystalline wax also provide good results in delaying swelling action. A pellet of the composition above described, provided with a "Pliolite"-wax emulsion coating (said coating constituting from 10–30% of the total weight of the pellet) will withstand cold water (below 80° F.) for from one hour to six hours without swelling to any substantial extent, depending on the weight of the coating material, within the range above set forth. A pellet of the same composition, without any coating, will begin to swell substantially in water or water-containing circulation fluid of the same temperature in about one-half hour.

The ratio of components or the specification of the individual ingredients of the blend in the example above set out are not critical. However, it is preferable that the polyvinyl alcohol used should be of the grade referred to as "completely hydrolyzed," for polyvinyl alcohol of that standard gels more readily with the sodium borate. A number of agents may be substituted for the sodium borate in obtaining gelling of the polyvinyl alcohol. Some of these are resorcinol, gallic acid, alpha-naphthol and the sodium salts of salicylanilide or disalicylbenzidine. Additionally, other types of fibrous materials, such as asbestos fiber, cotton fiber, glass fiber, etc. may be substituted for the peat moss fibers used in the above example. Other gelling mixtures which have been used with successful results are sodium lignosulfate-sodium dichromate or polyacrylic acid-aluminum sulfate. Other materials, having the desired properties, may successfully be used.

The specific gravity of the compositions above set out can be increased, without seriously changing their swelling or gelling characteristics, by addition of barium sulfate to the compositions. It may be advantageous to increase the density of the pellets for use in certain types of circulation fluids, particularly so-called weighted fluids. Rock dust and other fillers may be used in place of barium sulfate.

What we claim is:

1. A lost circulation pellet comprising a uniform mixture of from 5 to 70 parts of polyvinyl alcohol, 5 to 35 parts of an agent for producing a gel with said polyvinyl alcohol, and 5 to 70 parts of a fibrous material.

2. A lost circulation pellet comprising a uniform mixture of from 5 to 35 parts of sodium borate, 5 to 70 parts of peat moss, and 5 to 70 parts of polyvinyl alcohol.

References Cited in the file of this patent

UNITED STATES PATENTS

| | | |
|---|---|---|
| 1,920,564 | Jochum et al. | Aug. 1, 1933 |
| 2,065,512 | Cannon | Dec. 29, 1936 |
| 2,155,658 | Herrmann et al. | Apr. 25, 1939 |
| 2,376,371 | Lowe et al. | May 22, 1945 |
| 2,544,585 | Bruce et al. | Mar. 6, 1951 |
| 2,634,098 | Armentrout | Apr. 7, 1953 |
| 2,642,268 | Armentrout | June 16, 1953 |
| 2,705,050 | Davis et al. | Mar. 29, 1955 |

FOREIGN PATENTS

| | | |
|---|---|---|
| 413,624 | Great Britain | Oct. 13, 1932 |
| 950,250 | France | Mar. 21, 1949 |